United States Patent Office

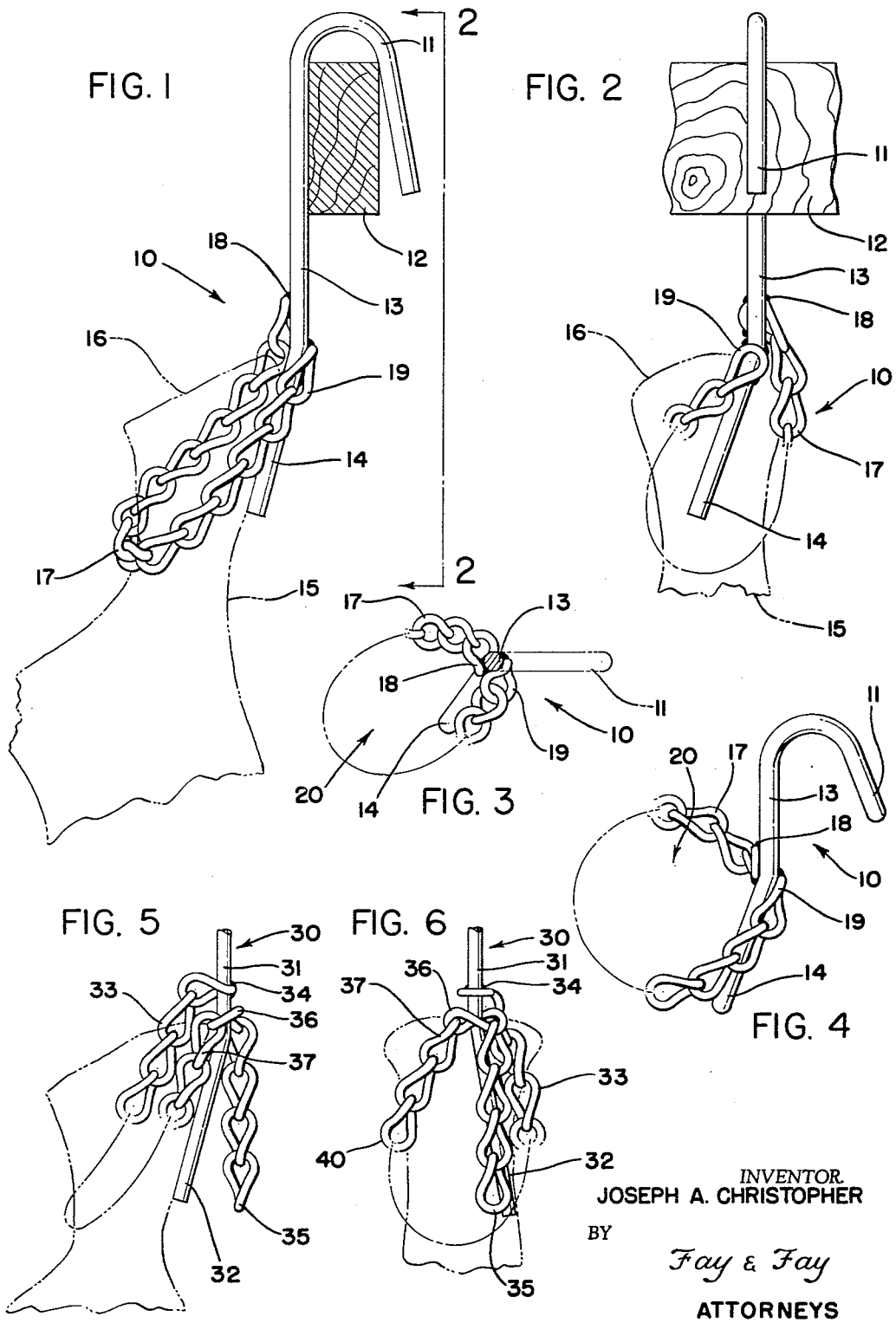

3,143,329
Patented Aug. 4, 1964

3,143,329
MEAT HANGER
Joseph A. Christopher, General Delivery,
Ashtabula, Ohio
Filed Nov. 7, 1962, Ser. No. 235,969
6 Claims. (Cl. 248—317)

This invention relates to a novel meat hanger and is more particularly directed to a meat hanger which is adapted to be used in transporting and storing sides of meat and the like.

In its broadest sense the invention contemplates the provision of a hook portion having a depending straight portion which merges into a terminal portion angulated outwardly and away from the straight portion. Suitable chain means is attached to said hook portion, said chain means being adapted to encircle the shank portion of a side of beef or the like below the knuckle. The chain means is attached in a manner so that the hook may be rotated about 90°, to expand the loop formed by the chain means. When the hook is returned to the upright position, after the chain has been looped around the knuckle portion of the side, the loop of chain diminishes in size, thereby grippingly engaging the side of beef in a manner so as not to injure the product. Additional means is provided in a further embodiment whereby the chain means is adjustable.

In the past, shipping and storing of beef in refrigerated enclosures has been achieved by utilization of an S-shaped hook, which is pointed on both ends. One end of the hook is received over a supported slat or bar, while the other end of the hook is inserted between the tendon and shank of the side. It is obvious that the hook must necessarily be pointed on at least one end in order to pierce and receive the side thereover. The hook in most instances is made of steel stock, ranging up to about three-quarters of an inch in diameter. It is obvious to those skilled in the art that the strength of the hook greatly exceeds the strength of the connection of the tendon to the bone or, alternatively, the strength of the tendon itself. In this regard, considerable problems have been encountered in the handling of sides of beef and the like. One of the main problems is damage to the side in shipment. Considerable sway, vibration and jarring normally occur in transit. All of these forces have served in the past to break the tendon or pull it loose at the knuckle, causing the side to become disengaged from the hook. The fall served to bruise the product and, in some instances, render a downgrading, for example, from prime to choice quality. This results in a considerable loss of money which must be borne either by the shipper, carrier or buyer.

A further problem which has been encountered in the prior art is the cost of replacing hooks that have been pilfered over the years. Pilferage costs the meat packing industry thousands of dollars each year for replacement of hooks which normally cost a small fraction of one dollar. One reason for the excessive pilferage is the variety of uses to which the S-shaped hook may be put, other than for transportation of meat.

The more recent commercial embodiments are pointed at both ends of the S so that they may be used either way. Of necessity, a grinding operation is required in the formation of the hooks to point the ends or, alternatively, they are forged to the required shape. However, in either case considerable expense is required to form a hook that is suitable for use as intended.

A still further objection in connection with the penetrating type hook is the gaping hole made in the product, rendering the meat therearound useless. A further disadvantage in connection with prior art devices is the need for the hook to be aligned with a hole in the side in order to hang the same, which is awkward when dealing with sides of several hundred pounds.

One of the most important aspects of the instant invention is the provision of a meat hanger which, because of its unique construction, will serve to suspend the meat without relying on the strength of the tendon or tendon connection. It is felt that this will severely reduce droppage in transit with the attendant savings.

A further aspect of the instant invention is that its use is generally restricted to hanging meat products with no other apparent uses. It is therefore felt that the considerable pilferage which has occurred in the past will be reduced by the instant device.

Still further, because of the novel toggling action of the chain, there will be no damage to the beef, as in the prior art devices, thereby making every portion of it usable.

A further advantage is found in the ease with which the hanger may be attached to the product. Because of the novel manner of connecting the chain to the hook portion, rotation of the hook through about 30° increases the inside of the loop sufficiently to allow the chain to be dropped over the knuckle portion. When the hook is rotated to an upright position, such as would be experienced in storing or transporting the side, the loop becomes smaller and grippingly engages the side below the knuckle portion. The toggling action of the chain serves to hold the beef tightly without damage, despite the vibration, sway and jarring experienced in shipment.

With the problems of the prior art in mind, it is therefore a general object of this invention to provide a new and improved meat hanger.

It is a still further object of this invention to provide a meat hanger which is quickly disposed over the knuckle portion of the side without requiring piercing, penetration, or the like.

It is a still further object of this invention to provide a novel meat hanger which, because of its toggling action, may be expediently slipped over the knuckle of a side.

It is a still further object of this invention to provide a meat hanger having a terminal or depending portion which extends along the shank portion of the side so as to insure a complete grip of the chain below the knuckle.

It is a still further object of this invention to provide a meat hanger which will facilitate expedient handling of beef in transportation and storage facilities.

Further and fuller objects of this invention will become readily apparent when reference is made to the accompanying drawings, wherein:

FIG. 1 is a side view in elevation of a hook with a depending chain portion extending around a fragmentary portion of a shank, with the slat shown in cross section;

FIG. 2 is a view taken along the line 2—2 of FIG. 1;

FIG. 3 is a plan view of the meat hanger of FIG. 1;

FIG. 4 is a plan view of the meat hanger of FIG. 1, with the hook rotated about 30° to increase the area of the loop of chain;

FIG. 5 is a view of a modified form of the invention, similar to FIG. 1; and

FIG. 6 is a rear view of the modified form of FIG. 5.

Referring now to FIG. 1, therein is shown a meat hanger indicated generally at 10. The meat hanger comprises a generally U-shaped hook portion 11 adapted to be received over a slat shown in cross section at 12. In the conventional arrangement, the slats 12 are carried within the car or mounted in the storage facility to receive hooks thereover. A substantially straight portion, indicated generally at 13, is integral with the hook portion 11 and extends downwardly into a terminal portion indicated at 14. The terminal portion, as viewed from the side, angles away from the straight and hooked portions, substantially conforming to the angle of taper on the suspended side shown fragmentarily at 15.

The side 15 has a knuckle portion indicated generally at 16 and is suspended from the hanger portion by a loop of bent link chain indicated at 17. The chain is fastened at one end 18 by means of a weld or the like to the straight portion 13. The opposite end of the chain or last link 19 is attached below the first link 18 at approximately the terminal portion 14. The chain shown at 17 is of the bent link variety and is particularly suitable for this application because of the toggling action, as will be hereinafter described.

A further feature, which is equally important, is the particular attachment of the chain to the hook means. The first link 18 is attached at an angle of approximately 45° to the straight portion on the front side of the straight portion away from the hook. The last link, indicated generally at 19, is attached at a similar angle on the rearward side or the side from which the hook 11 extends. The chain is fastened at an angle of between 30° and 45° and slightly below the first link 18.

As best seen in FIG. 4, when the hook portion is rotated approximately 30° with respect to the position seen in FIG. 1 or the hook, straight and terminal portions are lying in a substantially horizontal plane, the terminal and straight portions act to increase the size of the loop because of the particular angle of attachment of the links. Accordingly, the internal area of the loop, indicated generally at 20, is increased to facilitate placement of the chain over the knuckle portion of the animal. The hook 11 is then rotated to the vertical position, as in FIG. 1, diminishing the size of the loop 20 to grip the shank 15. The hook 11 may then be placed over the slat 12 to suspend the side for safe shipment or storage. As the weight of the side 15 settles in a downward direction, the terminal portion 14 gently forces it into the loop of chain 17, where the toggling action thereof tightly grips the product. The terminus 14 further serves to back the side against movements in a direction opposite to the bend.

It is obvious that this method of hanging beef is far easier than the piercing method now employed since one simple motion is all that is necessary to grip a side quickly. Contrasted with the prior art method of piercing the side, the instant method is far superior. When the hook is in the upright position, the chain becomes smaller, as best seen in FIG. 3, because the ends of the first link 18 and last link 19 are drawn closer together. The diminution is slight; however, it is all that is required in order to prevent the knuckle portion from slipping through the loop formed thereby. The toggling action of the chain 17, coupled with the wedging of the terminal portion 14, serves to grip the side as the weight of the shank is suspended.

A study of sides of beef reveals that the difference in sizes of shanks and knuckles between one and three year old steers is very slight and, therefore, one hook with the satisfactory number of links in the chain is all that is required to satisfy a shipper's needs, thereby allowing for uniformity in the device. For example, in chains wherein the outside length of each individual link is 1½" made from stock ¼" in diameter, 18 to 21 links will serve the necessary requirements. Moreover, the hook can be reduced down to less than ½" in diameter, thereby reducing costs when contrasted with prior art devices. The instant meat hanger facilitates greater ease in handling and hanging of sides, thereby reducing labor costs.

It is obvious that removal of the meat hanger may be achieved in a manner opposite to that of hanging. It is further obvious that suspension of a side does not depend upon the strength of the tendon or the strength of the joint between the tendon and shank bone. Moreover, since no penetration of the side is necessary in order effectively to hang the side, the damage caused thereby is completely eliminated.

Referring now to FIG. 5, therein is shown an alternative form of the invention. The hook means indicated fragmentarily at 30 has a straight portion 31 and terminal portion 30 substantially identical to that described in FIG. 1. The chain 33 is connected on the straight portion by welding or the like, as shown at 34. The opposite end of the chain indicated at 35 depends freely therefrom. In order to hold a small side, such as would be found in calves, hogs and the like, the chain is merely wrapped around the shank of the animal below the knuckle and the terminal portion inserted through a link, such as the one indicated at 36. The link 36 is slidably received on the terminal portion 32 where it is retained by the weight of the link 37 and depending links. The link 36, in the event of slippage, will serve continuously to reduce the size of the loop, thereby drawing the chain tighter and tighter about the shank of the animal. In practice, however, no sliding of the link 36 has been noted since, because of the angle at which the link 37 pulls on the link 36, a toggling action is experienced which allows frictional retention by the terminal portion of the hook means.

In the embodiment of FIGS. 5 and 6, the terminal portion 32 extends along the shank of the side, as in the embodiment of FIG. 1, serving the function of forcing the shank into tighter engagement with the chain loop 40. As noted, it serves the additional function of tightening the loop 40 if the free end of the chain should slip, thereby insuring a proper hanging, notwithstanding the forces normally occurring in transit.

The instant device provides a readily adjustable meat hanger which is intended for use in the smaller sizes of sides, where the variance is greater. It is obvious that this modification of meat hanger has the same advantages as the invention described in connection with FIGS. 1 through 4. As in the modification of FIG. 1, the terminal portion 32 is angled outwardly as seen in FIG. 5, the side elevational view, and away from a plane passing through the hook and straight portions as seen in FIG. 6. If the link 36 should accidentally begin to slide down the terminal portion, it would serve only to tighten the chain since the end 36 would be, in effect, pulling the chain more tightly about the shank. The particular toggling action which has been found to be very advantageous requires that bent link chain be used in order to achieve the maximum effectiveness of the meat hanger. Moreover, when the cost of the instant meat hangers is contrasted with the cost of those presently used, a reduction in cost is evident, together with the greater performance and advantages noted.

For ease of description the principles of the invention have been set forth in connection with but two illustrated embodiments. It is not intended that the embodiments shown, nor the terminology employed, be limiting inasmuch as variations in these may be made without departing from the spirit of the invention. Rather, I desire to be restricted only by the spirit and scope of the appended claims.

I claim:

1. A meat hanger for use in transporting and storing sides of meat comprising hook means adapted to be received over a slat, said hook means including a downwardly substantially straight portion which is integral with a terminal portion which angles downwardly and outwardly from said straight portion, chain means having a first link portion at one end attached slightly above the intersection of said terminal and straight portion, a second link portion removed from the first link portion of said chain means, said second link portion received on said terminal portion below said first link portion, thereby forming a loop grippingly to engage a side of meat with the angled terminal portion substantially conforming to the angle of a shank portion of said side.

2. The meat hanger of claim 1 wherein said chain means comprises bent link chain.

3. The meat hanger of claim 1 wherein said second link is welded to said terminal portion on a side thereof facing said hook means.

4. The meat hanger of claim 1 wherein the other link of said chan is slidably received over said terminal portion.

5. The meat hanger of claim 4 wherein said terminal portion is angled in a direction away from the side on which the first link portion is attached thereby to tighten the chain in the event of slipping.

6. The meat hanger of claim 1 wherein the first and second link portions are welded on opposite sides of said hook means.

No references cited.